DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED OCTOBER 1, 1974

927 O.G. 10

T927,010

PROCESS FOR EMBOSSING BIAXIALLY ORIENTED POLYESTER FILM

Harold B. Whitfield and David J. Chalmers, Circleville, Ohio, assignors to E. I. du Pont de Nemours and Company, Wilmington, Del.

Continuation of application Ser. No. 222,331, Jan. 31, 1972. This application Nov. 20, 1973, Ser. No. 417,594

Int. Cl. B29c *17/00*

U.S. Cl. 264—210 R

No Drawing. 9 Pages Specification

Biaxially oriented polyester film having a pattern embossed on one surface thereof is produced by extruding the film, orienting the film by stretching at least 2.5 times in two mutually perpendicular directions in the plane of the film, embossing one surface of the film prior to completion of heat setting, and heat setting the biaxially oriented film. The film is embossed by contacting the surface of the film after biaxial orientation and prior to completion of heat setting with a metal roll having a surface roughness of about from 25 to 80 microinches, A.A., a temperature of about from 175° to 220° C., and a pressure of about from 40 to 80 lbs. per lineal inch. The metal roll along with a rubber roll forms a nip through which the film is passed to effect the embossment.